(12) United States Patent
Fischer et al.

(10) Patent No.: US 9,643,617 B2
(45) Date of Patent: May 9, 2017

(54) FRICTION COEFFICIENT ESTIMATION FROM CAMERA AND WHEEL SPEED DATA

(71) Applicant: Continental Teves AG & Co. oHG, Frankfurt (DE)

(72) Inventors: Daniel Fischer, Schwalbach a. T. (DE); Stefan Stoelzl, Weinheim (DE); Andreas Koebe, Bensheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/431,208

(22) PCT Filed: Dec. 9, 2013

(86) PCT No.: PCT/DE2013/200340
§ 371 (c)(1),
(2) Date: Mar. 25, 2015

(87) PCT Pub. No.: WO2014/094767
PCT Pub. Date: Jun. 26, 2014

(65) Prior Publication Data
US 2015/0251659 A1    Sep. 10, 2015

(30) Foreign Application Priority Data
Dec. 20, 2012    (DE) .................. 10 2012 112 725

(51) Int. Cl.
*G06K 9/00* (2006.01)
*B60W 40/068* (2012.01)
(Continued)

(52) U.S. Cl.
CPC ........... *B60W 40/068* (2013.01); *B60T 8/171* (2013.01); *B60T 8/172* (2013.01); *B60T 8/1725* (2013.01);
(Continued)

(58) Field of Classification Search
None
See application file for complete search history.

(56) References Cited

U.S. PATENT DOCUMENTS

| 4,712,635 A | 12/1987 | Sumiya et al. |
| 5,351,192 A * | 9/1994 | Tsuyama ............... B60K 28/16 180/197 |

(Continued)

FOREIGN PATENT DOCUMENTS

| DE | 198 56 510 | 9/1999 |
| DE | 198 54 964 | 6/2000 |

(Continued)

OTHER PUBLICATIONS

Raqib Omer, "An Automatic Image Recognition System for Winter Road Surface Condition Monitoring", Master's Thesis, University of Waterloo, Ontario, Canada, Feb. 22, 2011, pp. i-xii, 1 to 68 retrieved at https://uwspace.uwaterloo.ca/handle/10012/5799.

(Continued)

*Primary Examiner* — Vu Le
*Assistant Examiner* — Samah Beg
(74) *Attorney, Agent, or Firm* — W. F. Fasse

(57) ABSTRACT

A method and an apparatus for estimating a friction coefficient in a moving vehicle analyze image data from a forward-looking vehicle camera to produce a camera friction coefficient $\mu_k$, and analyze tire slip and tire vibration based on a wheel speed signal to produce a wheel friction coefficient $\mu_w$. The camera and wheel friction coefficients are both considered to produce a proactive estimated friction coefficient that is primarily based on the camera friction coefficient $\mu_k$, whereas the wheel friction coefficient $\mu_w$ is taken into account to check plausibility of the camera friction coefficient $\mu_k$.

16 Claims, 2 Drawing Sheets

(51) Int. Cl.
  *B60T 8/171* (2006.01)
  *B60T 8/172* (2006.01)
(52) U.S. Cl.
  CPC ..... *G06K 9/00798* (2013.01); *B60W 2420/42* (2013.01); *B60W 2520/28* (2013.01)

(56) References Cited

U.S. PATENT DOCUMENTS

| | | | |
|---|---|---|---|
| 5,774,821 A | 6/1998 | Eckert | |
| 5,944,392 A * | 8/1999 | Tachihata | B60T 8/172 303/112 |
| 5,963,148 A | 10/1999 | Sekine et al. | |
| 6,597,980 B2 * | 7/2003 | Kogure | B60T 8/172 303/160 |
| 6,636,258 B2 * | 10/2003 | Strumolo | B60R 1/00 348/149 |
| 6,807,473 B1 | 10/2004 | Tran | |
| 7,315,777 B2 * | 1/2008 | Ono | B60T 8/1755 180/408 |
| 7,702,446 B2 * | 4/2010 | Hiwatashi | B60T 8/172 701/70 |
| 8,180,527 B2 | 5/2012 | Mueller-Schneiders et al. | |
| 8,306,747 B1 | 11/2012 | Gagarin et al. | |
| 8,666,562 B2 * | 3/2014 | Tuononen | B60T 8/172 701/1 |
| 8,957,949 B2 | 2/2015 | Randler et al. | |
| 9,081,387 B2 * | 7/2015 | Bretzigheimer | B60T 1/10 |
| 2002/0007661 A1 | 1/2002 | Takahashi | |
| 2003/0101805 A1 | 6/2003 | Raab | |
| 2004/0016870 A1 | 1/2004 | Pawlicki et al. | |
| 2005/0085987 A1 | 4/2005 | Yokota et al. | |
| 2007/0050121 A1 * | 3/2007 | Ammon | B60C 23/061 701/80 |
| 2008/0027607 A1 | 1/2008 | Ertl et al. | |
| 2010/0253541 A1 | 10/2010 | Seder et al. | |
| 2011/0245995 A1 | 10/2011 | Schwarz | |
| 2012/0029783 A1 * | 2/2012 | Takenaka | B60T 8/172 701/73 |
| 2012/0078483 A1 * | 3/2012 | Yajima | B60T 8/1764 701/73 |
| 2012/0167663 A1 | 7/2012 | Groitzsch et al. | |
| 2012/0323444 A1 | 12/2012 | Rieger et al. | |
| 2013/0332028 A1 | 12/2013 | Heger et al. | |
| 2014/0052325 A1 | 2/2014 | Naegele et al. | |
| 2014/0347448 A1 | 11/2014 | Hegemann et al. | |
| 2015/0166072 A1 * | 6/2015 | Powers | B60W 40/06 701/1 |
| 2015/0224925 A1 * | 8/2015 | Hartmann | B60R 1/00 348/148 |
| 2015/0344037 A1 * | 12/2015 | Siegel | B60W 50/0097 73/9 |
| 2015/0371095 A1 | 12/2015 | Hartmann et al. | |
| 2015/0375753 A1 * | 12/2015 | Schrabler | B60T 8/172 701/71 |
| 2016/0121902 A1 * | 5/2016 | Huntzicker | B60W 40/068 701/41 |
| 2016/0379065 A1 | 12/2016 | Hartmann | |

FOREIGN PATENT DOCUMENTS

| | | | |
|---|---|---|---|
| DE | 101 55 488 | 5/2003 | |
| DE | 102 56 726 | 6/2004 | |
| DE | 102004018088 | 2/2005 | |
| DE | 102004055069 | 2/2006 | |
| DE | 102004047914 | 3/2006 | |
| DE | 102004048637 | 4/2006 | |
| DE | 102006012289 | 9/2007 | |
| DE | 102008047750 | 5/2009 | |
| DE | 102010013339 | 1/2011 | |
| DE | 102009041566 | 3/2011 | |
| DE | 102011100907 | 1/2012 | |
| DE | 102010045162 | 3/2012 | |
| DE | WO 2012117044 A2 * | 9/2012 | B60T 1/10 |
| DE | 102011081362 | 2/2013 | |
| EP | 0 412 791 | 2/1991 | |
| EP | 0 792 228 | 9/1997 | |
| EP | 0 827 127 | 3/1998 | |
| EP | 1 201 521 | 5/2002 | |
| EP | 2 521 111 | 11/2012 | |
| JP | 07-035522 A | 2/1995 | |
| JP | 2005-226671 A | 8/2005 | |
| KR | 1020110032422 | 3/2011 | |
| WO | WO 2011/007015 | 1/2011 | |
| WO | WO 2012/110030 | 8/2012 | |
| WO | WO 2012/113385 | 8/2012 | |
| WO | WO 2013/009697 | 1/2013 | |

OTHER PUBLICATIONS

Maria Jokela et al., "Road Condition Monitoring System Based on a Stereo Camera", Intelligent Computer Communication and Processing, IEEE 5th International Conference ICCP 2009, Piscataway, NJ, USA, Aug. 27, 2009, XP031545069, pp. 423 to 428.

J. Chetan et al., "An Adaptive Outdoor Terrain Classification Methodology Using Monocular Camera", Intelligent Robots and Systems, IEEE International Conference IROS 2010, Piscataway, NJ, USA, Oct. 18, 2010, XP031920567, pp. 766 to 771.

J. H. Choi et al., "Road Identification in Monocular Color Images Using Random Forest and Color Correlogram", International Journal of Automotive Technology, vol. 13, No. 6, The Korean Society of Automotive Engineers, Heidelberg, Oct. 2, 2012, XP035120063, pp. 941 to 948.

Raquib Omer et al., "An Automatic Image Recognition System for Winter Road Surface Condition Classification", Intelligent Transportation Systems, 13th International IEEE Conference ITSC 2010, Piscataway, NJ, USA, Sep. 19, 2010, XP031792816, pp. 1375 to 1379.

T. Teshima et al., "Detection of the Wet Area of the Road Surface Based on a Saturated Reflection", Meeting on Image Recognition and Understanding, 2007, XP002730931, pp. 1218 to 1223, retrieved at http://hvrl.ics.keio.ac.jp/paper/pdf/domestic_Conference/2007/MIRU2007_teshima.pdf.

Ernst Dieter Dickmanns et al., "Dynamic Monocular Machine Vision", Machine Vision and Applications, 1988 Springer-Verlag New York Inc., pp. 223 to 240.

International Search Report of the International Searching Authority for International Application PCT/DE2013/200340, mailed Apr. 29, 2014, 2 pages, European Patent Office, HV Rijswijk, Netherlands.

PCT International Preliminary Report on Patentability including English Translation of PCT Written Opinion of the International Searching Authority for International Application PCT/DE2013/200340, issued Jun. 23, 2015, 9 pages, International Bureau of WIPO, Geneva, Switzerland.

German Search Report for German Patent Application No. 10 2012 112 725.5, dated Oct. 7, 2013, 5 pages, Muenchen, Germany, with English translation, 5 pages.

* cited by examiner

FRICTION COEFFICIENT ESTIMATION FROM CAMERA AND WHEEL SPEED DATA

FIELD OF THE INVENTION

This invention relates to a method and an apparatus for estimating the friction coefficient in a moving vehicle.

BACKGROUND INFORMATION

Sensing or determining the friction coefficient that acts between the tires and the road or detecting the condition of the road (e.g. dry, wet, snow-covered, and icy) from which the friction coefficient group can be derived is a major prerequisite to support the driver in his or her driving task and to avoid severe accidents. In general, assessment of the road conditions is the job of the driver, who will then adjust his or her driving style accordingly. Vehicle control systems such as ESC (Electronic Stability Control)/TCS (Traction Control System), or ABS (Anti-lock Braking System) help the driver to stabilize the vehicle in risky conditions, so that he or she will be better able to cope with driving in extreme situations.

Accident prevention is becoming increasingly important in driver assistance systems. Emergency braking and most recently also emergency collision avoidance systems are making an important contribution. But their effectiveness decisively depends on the friction coefficient of the ground. Moisture, snow, and ice reduce the coefficient of friction available between the tires and the road considerably compared to a dry road.

Document EP 792 228 B1 discloses a directional stability control system for ESP (Electronic Stability Program)/ESC controllers, which can be used in special situations to determine a friction coefficient. If at least one wheel utilizes the friction coefficient, e.g. when driving on a slippery road, the vehicle brake control system can determine the friction coefficient from the rotational behavior of the wheels and the ESP/ESC acceleration sensors.

Document DE 102 56 726 A1 discloses a method for generating a signal depending on road conditions using a reflection signal sensor, such as a radar or optical sensor. This facilitates proactive detection of the road condition in a motor vehicle.

Document DE 10 2004 018 088 A1 discloses a road recognition system having a temperature sensor, an ultrasonic sensor, and a camera. The road data obtained from the sensors is filtered, compared to reference data to determine whether the road is in drivable condition, in which process the type of road surface (e.g. concrete, asphalt, dirt, grass, sand, or gravel) and its condition (e.g. dry, icy, snow-covered, wet) can be classified.

Document DE 10 2004 047 914 A1 discloses a method for estimating the road condition in which data from multiple different sensors, such as camera, infrared sensor, rain sensor, or microphone, is merged to obtain a classification of the road condition to which a friction coefficient can be assigned.

It is further known that the friction coefficient information is not only output as driver information but also provided to other vehicle or driver assistance systems, so that these can adjust their operating state accordingly. For example, the ACC can be set to longer distances, or a curve warning function can be adjusted accordingly in case of a low friction coefficient.

Tire slip and tire vibration can be analyzed based on the wheel speed signal and then be used to classify the friction coefficient. The advantage is that this solution can be implemented as a pure software solution, which means cost-efficiently, in an electronic braking system (ESP). The disadvantage is that the friction coefficient cannot be determined proactively, but only after passing over the road surface.

Document DE 10 2008 047 750 A1 discloses a corresponding determination of traction using few sensors, in which torsional vibrations of a wheel of a vehicle are analyzed and a friction coefficient is estimated based on said analysis.

Document DE 10 2009 041 566 A1 discloses a method for determining a road friction coefficient $\mu$ in which a first constantly updated friction coefficient characteristic and a second friction coefficient variable that is only updated depending on the situation are combined into a joint estimated friction coefficient.

Document WO 2011/007015 A1 discloses a laser-based method for friction coefficient classification in motor vehicles.

Signals of a LiDAR or CV sensor aimed at the road surface are analyzed and subsequently friction coefficients are assigned based on the amplitude of the measured road surface. It can be estimated, for example, if snow, asphalt, or ice make up the road surface.

It is further known that images provided by one or several camera(s) in a vehicle can be interpreted in such a manner that conclusions with respect to the road surface can be drawn (e.g. based on reflections and brightness levels), which can also be used for friction coefficient classification. Since surroundings cameras are becoming more and more common in driver assistance systems (e.g. for detecting lane departures, traffic signs, and objects), this solution can also be provided cost-efficiently as a software add-on. It has the advantage that the friction coefficient can be estimated proactively. The disadvantage is that this method does not allow consistently precise interpretation because interferences (other vehicles, light sources, etc.) may have a negative effect on interpretation and result in misinterpretation.

Document WO 2012/110030 A2 discloses a method and an apparatus for estimating the friction coefficient using a 3D camera, such as a stereo camera. At least one image of the vehicle environment is taken using the 3D camera. The image data of the 3D camera is used to create a height profile of the road surface in the entire area in front of the vehicle. The anticipated local coefficient of friction of the road surface in the area in front of the vehicle is estimated from said height profile.

The approaches based on camera or tire speed signal evaluations described above have the disadvantages described there.

SUMMARY OF THE INVENTION

In view of the above, it is particularly an object of an embodiment of this invention to overcome or reduce the possibility of a misinterpretation of data with regard to estimation of a friction coefficient for a vehicle.

One basic idea of the solution according to the invention is a combination or merger of the two approaches: interpretation of the wheel speed signals and interpretation of the camera image of the surroundings. Suitable exchange and combined evaluation of the information from both subsystems allow proactive friction coefficient assessment and to minimize the risk of misinterpretations.

A method according to the invention for estimating the friction coefficient in a moving vehicle involves an analysis of image data of a forward-looking camera in the vehicle so as to allow conclusions with respect to the road surface. Classification of a friction coefficient from the camera (image) data provides a camera friction coefficient $\mu_k$. Tire slip and tire vibration are analyzed based on a wheel speed signal. An excitation spectrum by the road, which correlates with the friction coefficient, is determined from this analysis of the vibration behavior of the tire. This value is then taken to perform a classification of the friction coefficient, which provides a wheel friction coefficient $\mu_w$. Such an analysis is described, for example, in document DE 10 2008 047 750 A1. Proactive estimation of the friction coefficient is performed as a merger of the camera and wheel friction coefficients, wherein the proactive friction coefficient estimation is primarily based on the camera friction coefficient $\mu_k$ but the wheel friction coefficient $\mu_w$ is continuously taken into account to check the camera friction coefficient $\mu_k$ for plausibility.

An estimation of the friction coefficient can also be generated from the camera image of a stationary vehicle. But this friction coefficient estimate can only be checked for plausibility when the vehicle is moving.

In other words, both subsystems continuously provide their estimated friction coefficients $\mu_k$ (based on the camera) and $\mu_w$ (based on the wheel speed sensor) and preferably associated reliability information to a central evaluation unit (e.g. a software module in a driver assistance or electronic brake controller). It is there where the proactive friction coefficient estimation is performed, substantially based on the camera signal $\mu=\mu_k$. In addition, $\mu_w$ is constantly taken into account to increase robustness.

The camera data can advantageously be analyzed for a wet road surface.

The friction coefficient, also called coefficient of friction, adhesion coefficient, or friction factor, indicates the maximum force that can be transmitted between a road surface and a vehicle tire (e.g. in the tangential direction) and is therefore an essential parameter of the road condition. In addition to the road condition, tire properties are required for a complete determination of the friction coefficient. It is typically just road condition information that is considered for an estimate of the friction coefficient, e.g. from camera image data, since tire properties generally cannot be detected from camera image data. The term camera friction coefficient therefore always denotes an estimated friction coefficient that is determined by classifying the road conditions from the camera data. The wheel speed signals also contain information about the tire condition. However, the classification performed to determine the wheel friction coefficient typically also takes into account different road conditions.

One advantage of such merger is its cost-efficient implementation. On the other hand, the systems supplement one another advantageously, since even very small differences in the road surface can be detected based on the wheel speed signals (when the vehicle passes over them), even though these may not have been visible in the image. Vice versa, interferences in the image can quickly be confirmed as such if no change in the road surface was found after passing over the respective spot.

In a preferred embodiment, synchronism of the camera friction coefficient $\mu_k$ and the wheel friction coefficient $\mu_w$ is ensured taking into account the travel speed of the vehicle. The actual speed of the vehicle itself is used here to determine when a road section lying ahead will be passed over that already has an assigned camera friction coefficient $\mu_k$ from a current camera image. Camera and wheel friction coefficients must somehow be made congruent to be merged, but they cannot match at any given point in time because the camera is looking forward and cannot capture the road surface on which the tire is sitting at that point in time. Advantageously, other vehicle sensor information on the movement of the vehicle or odometer and time information is considered to determine the movement of the vehicle relative to the image sections and in this way ensure synchronism.

Advantageously, associated reliability information that can be taken into account in the merger is assigned to each camera friction coefficient $\mu_k$ and wheel friction coefficient $\mu_w$.

Preferably, a camera friction coefficient $\mu_k$ with associated high reliability information can be immediately released as a proactive friction coefficient $\mu$. If low reliability information is associated with the camera friction coefficient $\mu_k$, however, the system waits for confirmation from the wheel friction coefficient $\mu_w$. If this confirmation is given, the confirmed camera friction coefficient can be released, or an averaged value can be output if there is a deviation. The reliability information may be considered as a weighting when determining said averaged value. If the camera friction coefficient $\mu_k$ becomes unavailable, the system only resorts to the wheel friction value $\mu_w$.

In an advantageous embodiment, suitable merger or analysis of the two pieces of information or friction coefficient estimates $\mu_k$ and $\mu_w$, respectively, provides an opportunity to adjust the method to the characteristic field conditions of the vehicle or the driver by "learning" (e.g. the typical interferences in the image) during operation, thus increasing its availability and robustness. Typical interferences in the image are particularly identified and learned by checking the plausibility of the camera friction coefficient $\mu_k$ using the wheel friction coefficient $\mu_w$ if a deviation is detected in the process. After perfect training of the system, the precision of the friction coefficient estimation as can be provided by the wheel speed analysis can also be achievable proactively.

Depending on the main use of the camera system, the camera can be a mono camera, a stereo camera, or a camera of a panoramic view system.

According to a preferred embodiment, information of the method for friction coefficient estimation according to the invention is made available to other driver assistance systems or drive dynamics control systems and can be used there in a known way to adjust the operating state accordingly (e.g. the ACC distance). Suitable information includes the proactive friction coefficient, the camera friction coefficient $\mu_k$, the wheel friction coefficient $\mu_w$, and/or the associated reliability information.

The invention further relates to an apparatus for estimating the friction coefficient in a moving vehicle using a forward-looking camera, at least one wheel speed sensor, and evaluation means.

The evaluation means are configured to analyze image data of the camera so as to allow conclusions with respect to the road surface and to perform a friction coefficient classification. Said friction coefficient classification provides a camera friction coefficient $\mu_k$. The wheel speed sensor transmits wheel speed signals to the evaluation means. The evaluation means are further configured to analyze a tire slip and a tire vibration based on a wheel speed signal and to use the same to perform a classification of the friction coefficient which provides a wheel friction coefficient $\mu_w$. Proactive estimation of the friction coefficient is performed as a merger of the camera friction coefficient $\mu_k$ and the wheel friction coefficient $\mu_w$, wherein the proactive friction coefficient estimation is primarily based on the camera friction coefficient $\mu_k$ but the wheel friction coefficient $\mu_w$ is continuously taken into account to check the camera friction coefficient $\mu_k$ for plausibility. The evaluation means can be distributed across multiple evaluation units based on the modular principle. It is preferred that the images are analyzed in a controller of the camera system, which can transmit the camera friction coefficient $\mu_k$ to a bus system. The wheel speed analysis is performed in an EBS controller which can transmit the wheel friction coefficient $\mu_w$ to the bus system. Taking into consideration the synchronism of the friction coefficient data, the merger is performed, for example, in a third controller that can receive the friction coefficients $\mu_k$ and $\mu_w$ from the bus system. In another preferred embodiment, synchronization of the friction coefficient data and its subsequent merger can be performed in the controller of the camera system or in the EBS controller, which for this purpose can receive the other friction coefficient $\mu_w$ or $\mu_k$ from the bus system. It is also conceivable that a central evaluation unit includes any and all evaluation means and performs all evaluation steps.

BRIEF DESCRIPTION OF THE DRAWING

The invention will be explained in more detail below with reference to the drawings and exemplary embodiments. In the drawings.

DETAILED DESCRIPTION OF EXAMPLE EMBODIMENTS OF THE INVENTION

Figure 1:
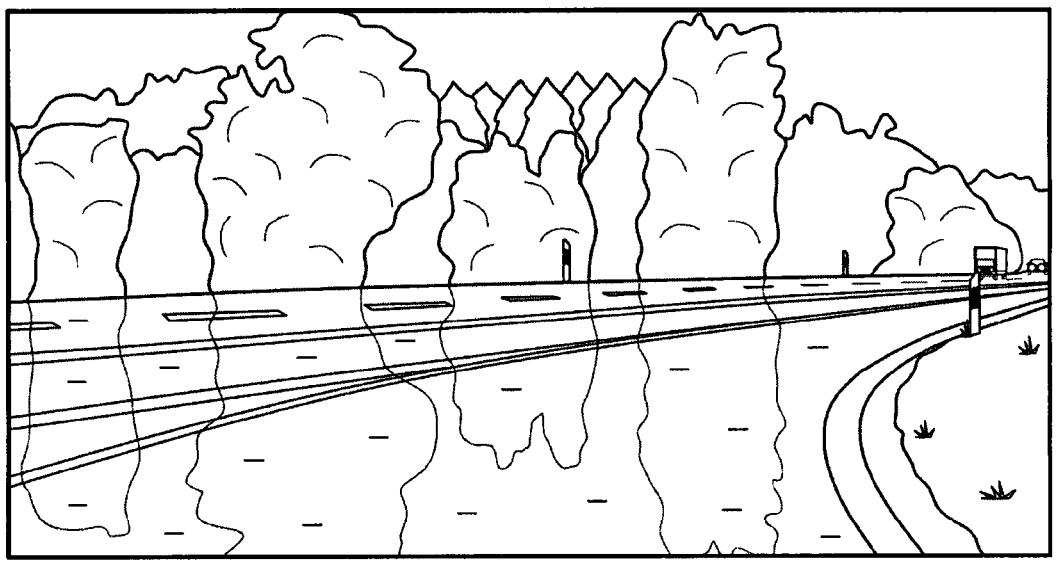
FIG. 1 is an illustration of a camera image of a scene ahead of a vehicle, demonstrating reflections on a road surface, which present difficulties in the evaluation of a friction coefficient of the road surface.

The only FIG. 1 shows an example of a camera image of the vehicle environment lying ahead as taken by a front camera of a moving vehicle. Camera-based driver assistance functionality can be implemented from the same image, e.g. a lane departure warning (LDW) function, a lane keeping assistance/system (LKA/LKS), a traffic sign recognition (TSR) function, an intelligent headlamp control (IHC) function, a forward collision warning (FCW) function, a precipitation detection function, an adaptive cruise control (ACC) function, a parking assistance function, an automatic emergency brake assist (EBA) function or emergency steering assist (ESA) function.

A reflecting road surface is visible in the camera image (gray scale image of a monocular camera) shown in FIG. 1. Reflection effects on the road surface can be recognized in the camera image since trees (or the general surroundings) appear mirrored on the road surface.

Reflection on the road surface can have various causes: a road surface wet from rain, but also a fresh dry pavement can result in reflections. A road section comprising reflections is assigned another friction coefficient $\mu_k$ than a section that does not reflect. However, actual friction coefficients for roads wet from rain clearly differ from friction coefficients for freshly paved dry road surfaces.

Figure 2:
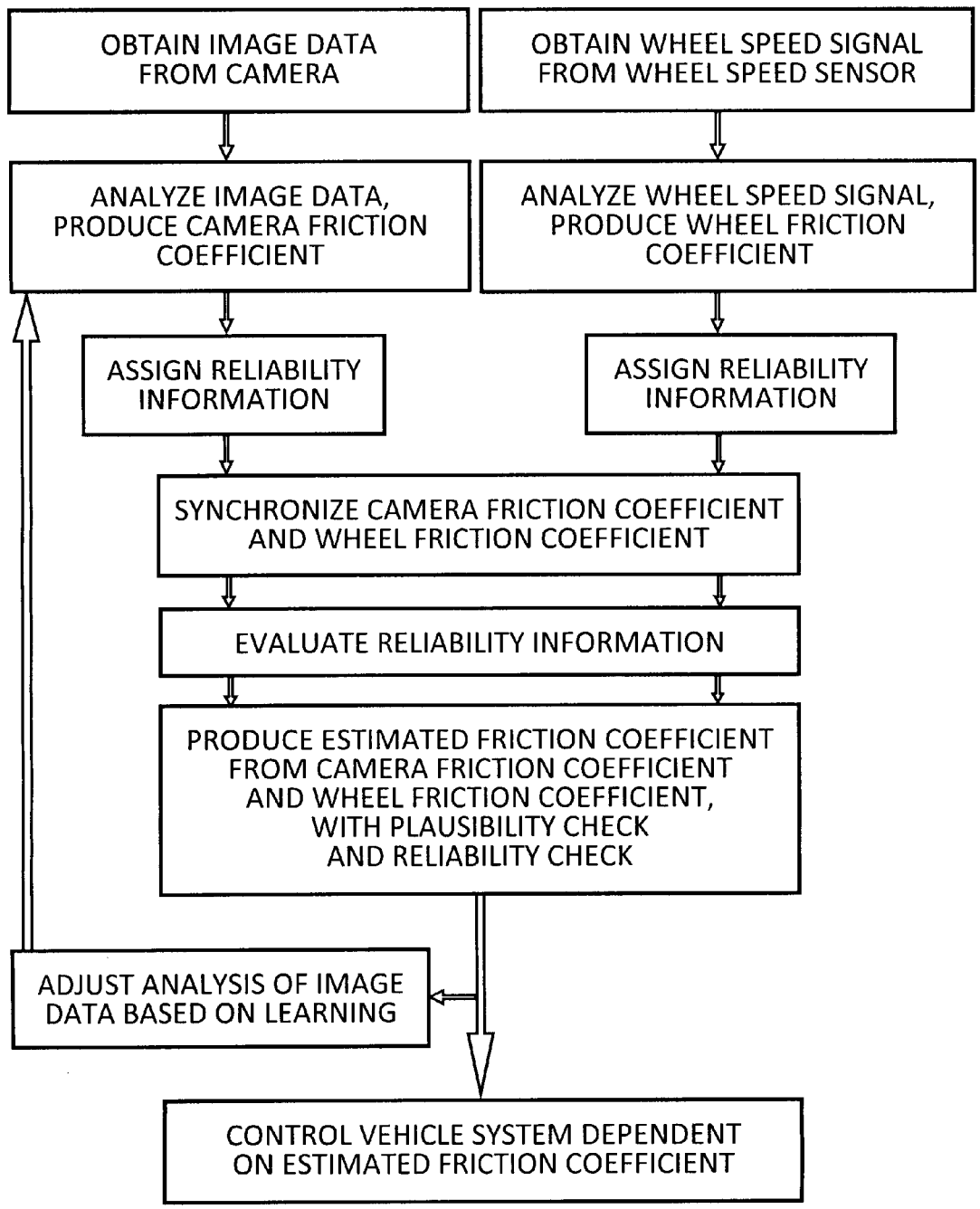
FIG. 2 is a schematic flow diagram showing steps and features of an example embodiment of a method of estimating a friction coefficient according to the invention.

The flow diagram of FIG. 2 schematically represents steps and features of a particular example embodiment of a method according to the invention for estimating the actual friction coefficient. The method starts with obtaining image data from a camera of the vehicle, and obtaining a wheel speed signal from a wheel speed sensor of the vehicle. The image data is analyzed to produce a camera friction coefficient. The wheel speed signal is analyzed to produce a wheel friction coefficient. Respective reliability information may be assigned respectively to the camera friction coefficient and the wheel friction coefficient. Because the camera friction coefficient is determined from the image data regarding a section of the road surface out ahead of the vehicle, while the wheel friction coefficient is determined from the wheel speed signal pertaining to a section of the road surface on which the wheal is currently traveling, it is appropriate to synchronize the camera friction coefficient with the wheel friction coefficient dependent on the traveling speed of the vehicle, in order that the two friction coefficients both relate to the same section of the road. Furthermore, the respective reliability information assigned to the friction coefficients, if applicable, can be checked to determine whether the respective friction coefficient can be used as a reliable value. Then, based on consideration of the camera friction coefficient and the wheel friction coefficient, the method produces an estimated friction coefficient. In this regard the estimated friction coefficient is primarily based on the camera friction coefficient, while the wheel friction coefficient is used for plausibility checking of the camera friction coefficient. Finally, a vehicle system such as a driver assistance system or a vehicle dynamics control system is controlled or adjusted dependent on the estimated friction coefficient.

Furthermore, when a disparity between the camera friction coefficient and the wheel friction coefficient is recognized, the method can adjust the analysis of the image data so that the camera friction coefficient better matches the wheel friction coefficient in successive cycles of the method steps. For example, in the problematic case of a reflecting new road, the friction coefficient $\mu_k$ estimated from the camera image would initially have to be rated uncertain. After passing over such a road section and evaluating the friction coefficient $\mu_w$ obtained for it from a wheel speed signal, the system would learn this "interference" and determine $\mu_k$ correctly and reliably thereafter. This subsequent learning by checking the plausibility is a major advantage of the invention.

The invention claimed is:

1. A method for a moving vehicle, comprising:
analyzing image data of a forward-looking camera in the vehicle to produce a camera friction coefficient regarding a road surface represented in the image data,
analyzing a tire slip and a tire vibration of a tire of the vehicle based on a wheel speed signal to produce a wheel friction coefficient regarding adhesion between the tire and the road surface;
respectively assigning associated reliability information to the camera friction coefficient and the wheel friction coefficient; and
producing an estimated proactive friction coefficient as a merger of the camera friction coefficient and the wheel friction coefficient, wherein the camera friction coefficient is released directly as the estimated proactive friction coefficient when the associated reliability information assigned to the camera friction coefficient is high, a plausibility of the camera friction coefficient is checked and a value of the camera friction coefficient is confirmed based on the wheel friction coefficient to produce the estimated proactive friction coefficient when the associated reliability information assigned to the camera friction coefficient is low, and when the camera friction coefficient becomes unavailable then the wheel friction coefficient is released as the estimated proactive friction coefficient.

2. The method according to claim 1, further comprising synchronizing the camera friction coefficient and the wheel friction coefficient taking into account a travel speed of the vehicle.

3. The method according to claim 1, which is adjusted to characteristic field conditions of the vehicle and/or a driver of the vehicle by learning, comprising learning typical interferences in the image data which are identified by the checking of the plausibility of the camera friction coefficient using the wheel friction coefficient.

4. The method according to claim 1, wherein a mono camera is used as the camera.

5. The method according to claim 1, wherein a stereo camera is used as the camera.

6. The method according to claim 1, wherein a camera of a panoramic view system is used as the camera.

7. The method according to claim 1, wherein the estimated proactive friction coefficient, the camera friction coefficient and/or the wheel friction coefficient is transmitted to other driver assistance systems or driving dynamics control systems of the vehicle.

8. An apparatus for a moving vehicle,
including a forward-looking camera, at least one wheel speed sensor, and evaluation means,
wherein:
the evaluation means are configured to analyze image data of the camera in the vehicle to produce a camera friction coefficient regarding a road surface represented in the image data,
the wheel speed sensor is configured and arranged to transmit a wheel speed signal to the evaluation means,
the evaluation means are further configured to analyze a tire slip and a tire vibration of a tire of the vehicle based on the wheel speed signal to produce a wheel friction coefficient regarding adhesion between the tire and the road surface,
the evaluation means are further configured to respectively assign associated reliability information to the camera friction coefficient and the wheel friction coefficient, and
the evaluation means are further configured to produce an estimated proactive friction coefficient by a merger of the camera friction coefficient and the wheel friction coefficient, wherein the camera friction coefficient is released directly as the estimated proactive friction coefficient when the associated reliability information assigned to the camera friction coefficient is high, a plausibility of the camera friction coefficient is checked and a value of the camera friction coefficient is confirmed based on the wheel friction coefficient to produce the estimated proactive friction coefficient when the associated reliability information assigned to the camera friction coefficient is low, and when the camera friction coefficient becomes unavailable then the wheel friction coefficient is released as the estimated proactive friction coefficient.

9. A method of estimating an actual friction coefficient of a road surface on which a vehicle is driving, comprising steps:
a) obtaining image data of an image of said road surface, from a forward-looking camera of said vehicle;
b) by analyzing said image data, producing therefrom a camera friction coefficient as a first estimate of said actual friction coefficient of said road surface;
c) obtaining a wheel speed signal from a wheel speed sensor of said vehicle;
d) by analyzing said wheel speed signal, determining therefrom a tire slip and a tire oscillation regarding motion of a tire of said vehicle relative to said road surface;
e) based on said tire slip and said tire oscillation, determining a wheel friction coefficient as a second estimate of said actual friction coefficient of said road surface;
f) respectively assigning associated reliability information to the camera friction coefficient and the wheel friction coefficient; and
g) determining a proactive estimation of said actual friction coefficient of said road surface from said camera friction coefficient and said wheel friction coefficient, wherein said camera friction coefficient is released directly as said proactive estimation of said actual friction coefficient when said associated reliability information assigned to said camera friction coefficient is above a threshold, a plausibility of said camera friction coefficient is checked and a value of said camera friction coefficient is confirmed based on said wheel friction coefficient to produce said proactive estimation of said actual friction coefficient when said associated reliability information assigned to said camera friction coefficient is below said threshold, and when said camera friction coefficient becomes unavailable then said wheel friction coefficient is released as said proactive estimation of said actual friction coefficient.

10. The method according to claim 9, wherein said steps a) to g) are performed by at least one of electronic controllers and electronic evaluation units of said vehicle, and further comprising providing said proactive estimation of said actual friction coefficient to a system of said vehicle selected from a driver assistance system and a driving dynamics control system, and adjusting an operation of said system in response to and dependent on said proactive estimation of said actual friction coefficient.

11. The method according to claim 9, further comprising repetitively performing said steps a) to f) in successive cycles, and in each one of said cycles when said camera friction coefficient fails said plausibility check then adjusting said producing of said camera friction coefficient from said image data so that said camera friction coefficient is brought closer to correspondence with said wheel friction coefficient in subsequent ones of said cycles.

12. A method of estimating an actual friction coefficient of a road surface on which a vehicle is driving, comprising steps:
a) obtaining image data of an image of said road surface, from a forward-looking camera of said vehicle;
b) by analyzing said image data, producing therefrom a camera friction coefficient as a first estimate of said actual friction coefficient of said road surface;
c) obtaining a wheel speed signal from a wheel speed sensor of said vehicle;
d) by analyzing said wheel speed signal, determining therefrom a tire slip and a tire oscillation regarding motion of a tire of said vehicle relative to said road surface;
e) based on said tire slip and said tire oscillation, determining a wheel friction coefficient as a second estimate of said actual friction coefficient of said road surface;
f) providing a first reliability information indicative of a reliability of said camera friction coefficient;

g) when said first reliability information meets or exceeds a reliability threshold, then outputting said camera friction coefficient as an estimation of said actual friction coefficient;

h) when said first reliability information falls below said reliability threshold, then performing a plausibility check of said camera friction coefficient by comparing said camera friction coefficient with said wheel friction coefficient;

i) when said camera friction coefficient passes said plausibility check, then outputting said camera friction coefficient as an estimation of said actual friction coefficient; and j) when said camera friction coefficient fails said plausibility check, then producing and outputting an estimation of said actual friction coefficient dependent on said wheel friction coefficient.

13. The method according to claim 12, wherein said producing of said estimation of said actual friction coefficient when said camera friction coefficient fails said plausibility check comprises averaging said camera friction coefficient and said wheel friction coefficient.

14. The method according to claim 13, further comprising providing a second reliability information indicative of a reliability of said wheel friction coefficient, and wherein said averaging comprises weighted averaging in which said camera friction coefficient and said wheel friction coefficient are weighted dependent on said first reliability information and said second reliability information respectively.

15. The method according to claim 12, wherein said producing of said estimation of said actual friction coefficient when said camera friction coefficient fails said plausibility check comprises providing said wheel friction coefficient as said estimation of said actual friction coefficient.

16. The method according to claim 12, wherein said steps a) to j) are performed by at least one of electronic controllers and electronic evaluation units of said vehicle, and further comprising providing said estimation of said actual friction coefficient to a system of said vehicle selected from a driver assistance system and a driving dynamics control system, and adjusting an operation of said system in response to and dependent on said estimation of said actual friction coefficient.

\* \* \* \* \*